United States Patent
Khen et al.

(10) Patent No.: US 7,908,549 B2
(45) Date of Patent: *Mar. 15, 2011

(54) SPREADSHEET CALCULATION AS PART OF WORKFLOW

(75) Inventors: Dan Y. Khen, Bellevue, WA (US); Dan Battagin, Bellevue, WA (US); Eran Megiddo, Bellevue, WA (US); Liviu Asnash, Bellevue, WA (US); Scott Walter Bishel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/298,380

(22) Filed: Dec. 8, 2005

(65) Prior Publication Data
US 2007/0136653 A1    Jun. 14, 2007

(51) Int. Cl.
*G06F 17/00* (2006.01)
(52) U.S. Cl. ......... 715/212; 715/217; 715/219; 715/224; 707/608
(58) Field of Classification Search ................. 715/212, 715/217, 219, 224; 705/1; 707/608
See application file for complete search history.

(56) References Cited

U.S. PATENT DOCUMENTS

| | | | | |
|---|---|---|---|---|
| 5,883,623 | A | 3/1999 | Cseri | 345/335 |
| 6,003,012 | A | 12/1999 | Nick | 705/10 |
| 6,009,455 | A | 12/1999 | Doyle | 709/201 |
| 6,023,691 | A | 2/2000 | Bertrand et al. | 706/2 |
| 6,157,934 | A * | 12/2000 | Khan et al. | 715/234 |
| 6,256,651 | B1 | 7/2001 | Tuli | 707/526 |
| 2002/0077842 | A1* | 6/2002 | Charisius et al. | 705/1 |
| 2004/0128147 | A1 | 7/2004 | Vallinayagam et al. | 705/1 |
| 2005/0039114 | A1 | 2/2005 | Naimat et al. | 715/503 |
| 2005/0049906 | A1 | 3/2005 | Leymann et al. | 705/8 |
| 2005/0097146 | A1 | 5/2005 | Konstantinou et al. | 707/200 |
| 2005/0108052 | A1 | 5/2005 | Omaboe | 705/2 |

OTHER PUBLICATIONS

Dovico™ Software, "Investing in Better Time & Expense Gathering", Jun. 2005, http://www.dovico.com/documents/Investing-in-Better-Time-Expense-Gathering.pdf, 11 pages.

Entology, "Large Diversified Manufacturer Achieves Sarbanes-Oxley Compliance through Financial Document Management", http://www.entology.com/press/cs/cs_029.htm, 2003, 2 pages.

"WP01:WebSphere MQ Workflow-Performance Estimates and Capacity Assessments", Oct. 5, 2005 ←/aq/(Oct. 7, 2010) http://www.1.ibm.com/support/docview.wss?rs=171&uid=swg24006573&loc=enUS&cs=ytu-8&lang=en, 2 pages.

Quixa, Builder/Quixa Solutions, http://www.quixa.com/ultimus/builder.asp, 2005, 4 pages.

* cited by examiner

*Primary Examiner* — Adam M Queler
(74) *Attorney, Agent, or Firm* — Merchant & Gould PC (57) ABSTRACT

A workflow includes an activity that takes advantage of spreadsheet calculations. For a spreadsheet activity, calculation and extraction of values from a spreadsheet is performed. Thus, spreadsheet calculations are integrated into workflows without user intervention. Values from previous activities in the workflow may be obtained and provided to the spreadsheet (e.g., cell values are set, modified, or adjusted). The spreadsheet may then be recalculated using these obtained values. Moreover, values from the spreadsheet may be used in subsequent parts of the workflow. Also, any number of spreadsheet activities may be incorporated into a workflow, and one spreadsheet activity may provide values to a second spreadsheet activity in the workflow.

12 Claims, 5 Drawing Sheets

SPREADSHEET CALCULATION AS PART OF WORKFLOW

BACKGROUND

Spreadsheet software, such as MICROSOFT's EXCEL software, operates to simulate paper spreadsheets, also sometimes called worksheets, or workbooks, in which columns of numbers are operated upon mathematically, e.g., summed, multiplied, etc., for budgets, plans, models, and other tasks. A typical spreadsheet software user interface appears on screen as a matrix of rows and columns, the intersections of which are called "cells." The cells can be filled with labels, numeric values, or formulas. Labels are descriptive text such as "Rent" and "Gross Sales." Values are the actual numeric data, and formulas command the spreadsheet to perform specific calculations based on the values; for example, the formula SUM CELLS A5 TO A10, may cause the spreadsheet software to sum the cells found at column A, rows 5 to 10. Formulas allow interrelationships of cells, and they are easy to create. For instance, one may merely point to a cell and click, and then press a key (+,−, etc.) of any arithmetic operation intended to affect the cell. For example, the creation of a formula might be "the contents of this cell PLUS the contents of this cell DIVIDED BY the contents of the next cell over to the left."

After numbers are added or changed, the formulas generally recalculate the data automatically or at the initiation of the user, e.g., with the press of a key. This can create a recalculation "ripple" effect throughout multiple cells. Since the contents of any cell can be calculated with or copied to any other cell, a total of one column can be used as a detail item in another column. For example, the total from a column of expense items can be carried over to a summary column showing all expenses. If the contents of a cell in the detail column changes, its column total changes, which is then copied to the summary column, and the summary total changes.

Such a ripple effect lets a user create a plan or model, plug in different assumptions about the model, i.e., change parameters, and immediately see the impact on the bottom line. This "what if?" capability makes the spreadsheet indispensable for budgets, plans, and other equation-based tasks. The "what if?" capability thus allows users to change underlying parameters, such as interest rate, of a mathematical model, such as growth of bank account over time. The "what if?" similarly allows a user to change underlying facts, such as starting bank account balance, the formulas interrelating the cells, such as calculating interest with or without a formula that compounds interest, and even the names of the cells to address different mathematical scenarios.

Thus, spreadsheets include business logic in the form of models and calculations, as well as data. A workflow is a set of relationships between the activities in a project, from start to finish. Activities are related by different types of trigger relation. Activities may be triggered by external events or by other activities. There are many business workflow scenarios that may be suited for calculation and extraction of values from database workbooks, such as MICROSOFT EXCEL workbooks. Workflow processes are often asynchronous to user intervention and thus need to work on server automated systems. Software driven workflows usually have the need to work asynchronously, without user intervention. Spreadsheet calculations have not been capable of being called in an automated workflow.

SUMMARY

A workflow includes an activity that takes advantage of spreadsheet calculations. For a spreadsheet activity, setting of values into a spreadsheet, calculation, and extraction of values from the spreadsheet is performed. Thus, spreadsheet calculations are integrated into workflows without user intervention. For example, spreadsheet calculations are called as a step in an automated workflow. The spreadsheet file is recalculated during the workflow.

Values from previous activities in the workflow may be obtained and provided to the spreadsheet (e.g., cell values are set, modified, or adjusted). The spreadsheet may then be recalculated using these obtained values. Moreover, values from the spreadsheet may be used in subsequent parts of the workflow. Also, any number of spreadsheet activities may be incorporated into a workflow, and one spreadsheet activity may provide values to a second spreadsheet activity in the workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
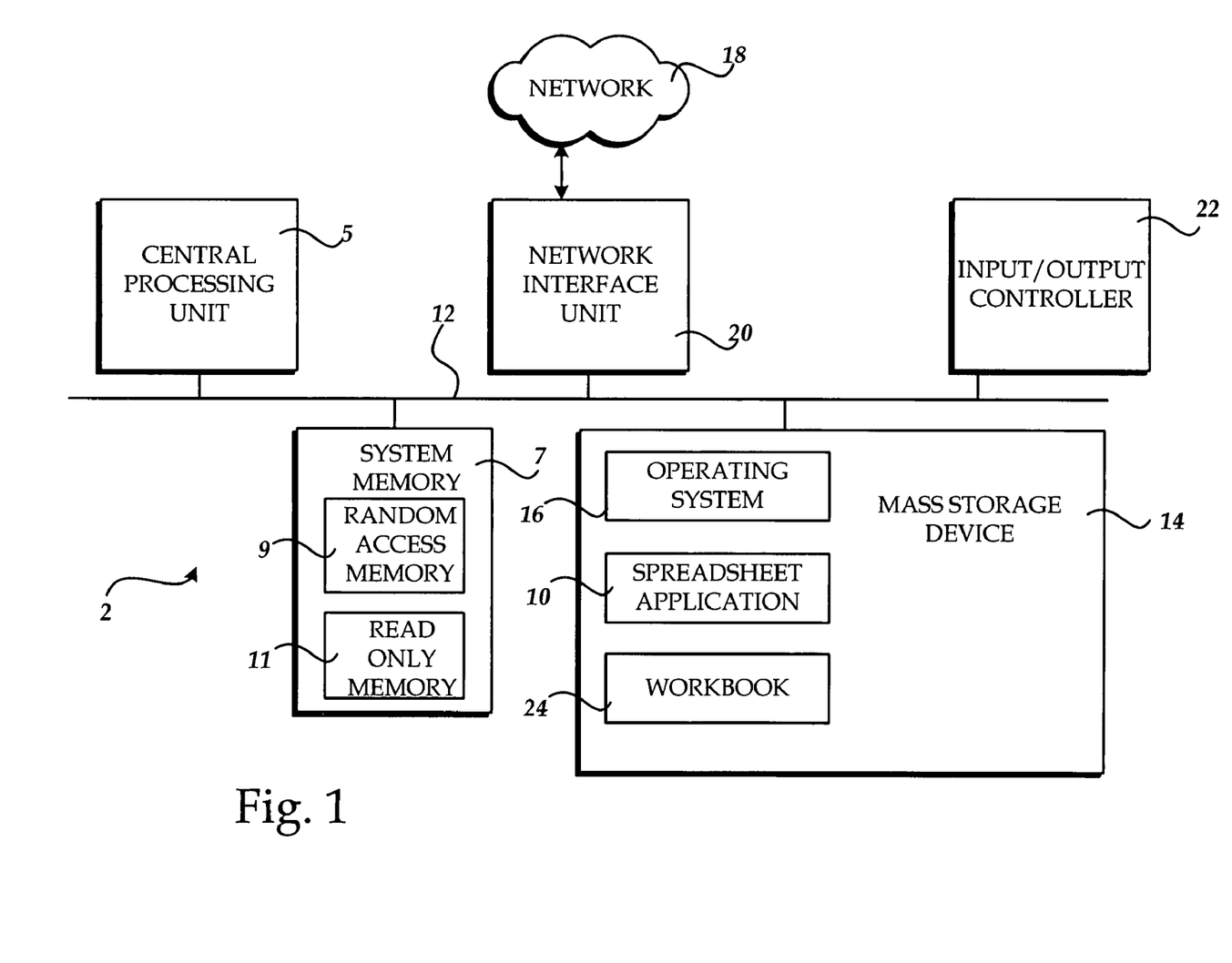
FIG. 1 is a block diagram representing an exemplary non-limiting computing system environment.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/ output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

A number of program modules and data files may be stored in the mass storage device 14 and RAM 9 of the computer 2, including an operating system 16 suitable for controlling the operation of a networked personal computer. The mass storage device 14 and RAM 9 may also store one or more program modules. In particular, the mass storage device 14 and the RAM 9 may store a spreadsheet application program 10. Moreover, the spreadsheet application program 10 may be operative to generate, access, and modify, for example, a workbook 24.

According to one embodiment of the invention, the spreadsheet application program 10 comprises the EXCEL spreadsheet application program from MICROSOFT CORPORATION. It should be appreciated, however, that other spreadsheet application programs from other manufacturers may be utilized to embody the various aspects described or contemplated herein.

The workbook is a file that may be created by a spreadsheet program, for example, that contains one or more worksheets (a worksheet may also be referred to herein as a "spreadsheet"). A worksheet is a single page organized into rows and columns within the spreadsheet program and appearing on screen. Through the use of these features, a user can create models of financial and numerical problems and solutions. Alternately, for example, a workbook may be created programmatically, e.g., if the file format is public, such as an extensible markup language (XML) file format.

A spreadsheet document may be displayed. A user of the computer may interact with a display of the spreadsheet. The user may also be permitted to request that the spreadsheet file be opened in the spreadsheet application program 10. In response to such a request, the spreadsheet application 10 will be launched and the spreadsheet file will be loaded by the spreadsheet application program 10.

Figure 2:
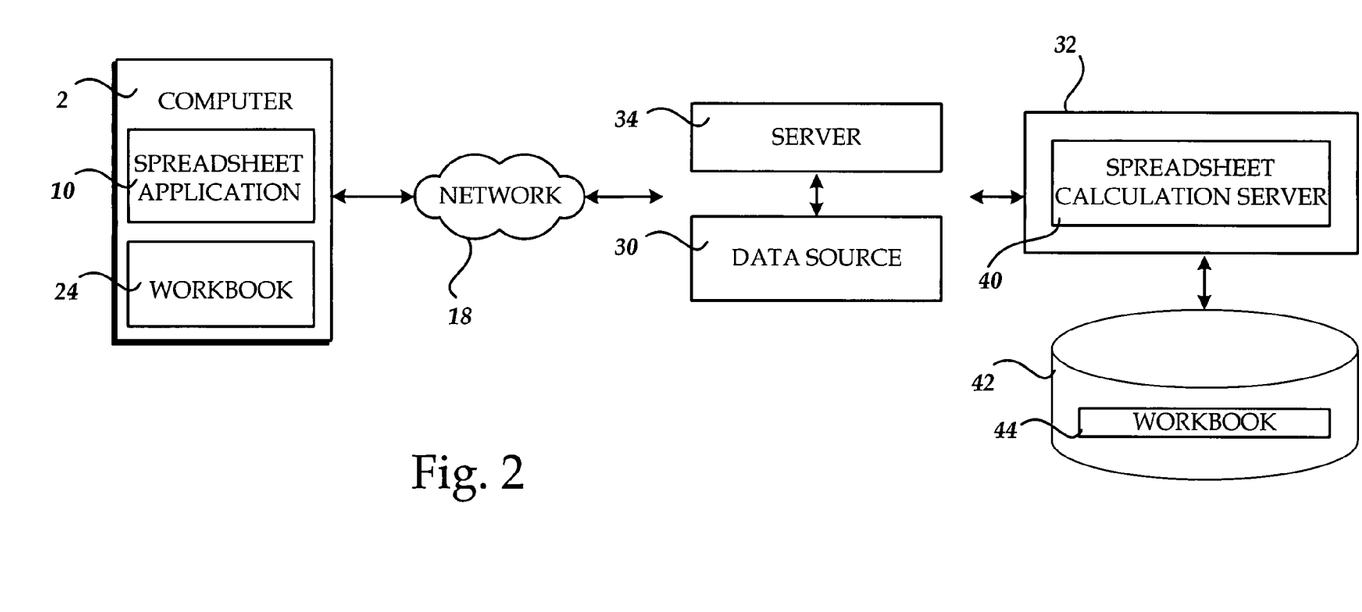
FIG. 2 is a block diagram representing an exemplary network environment.

Referring now to FIG. 2, a network architecture diagram will be described that illustrates an operating environment for the various embodiments of the invention. As shown in FIG. 2, the computer 2 is connected to a network 18. Also connected to the network 18 is a server 34. The server 34 comprises a server computer which may contain some or all the conventional computing components described above with respect to FIG. 1. The server 34 can receive and respond to requests for documents stored at or accessible to the server 34, e.g., at a data source 30, a database 42, or other storage device.

An interface may be provided to a user of the computer 2 to interact with a spreadsheet or workbook accessible via the network 34. A server application programming interface ("API") may be provided such that the API is operative to enable communication with a spreadsheet calculation server 32. The spreadsheet calculation server 32 is operative to execute a spreadsheet calculation server program 40. The spreadsheet calculation server program 40 comprises an executable program for retrieving and calculating spreadsheets, such as the workbook 44 stored in the database 42, for example.

In a workflow, when there is a human-intervention step, the user may use a spreadsheet application 10, but not necessarily a separate copy of the workbook 24. Sometimes there may be a separate copy (e.g., the server sends an email including the copy) and sometimes the user may use the application 10 to view the server workbook 44. Moreover, it is contemplated that the workbook 44 may reside anywhere, such as on a filesystem, and not in a database. It should be appreciated that in the embodiments of the invention described herein, the spreadsheet calculation server program 40 comprises a calculation server, such as the EXCEL CALCULATION SERVER program from MICROSOFT CORPORATION. However, other programs for calculating a spreadsheet on a server computer may be utilized. It should also be appreciated that the calculation server 32 may include many of the conventional hardware and software components discussed above with respect to FIG. 1.

A workflow comprises activities. Conventionally, each activity is strung together to create a workflow that is a sequential process through which actions occur. A spreadsheet has volatile data that may change over time. It is desirable to extend the workflow to expose spreadsheet calculation activity as part of the workflow process.

Figure 3:
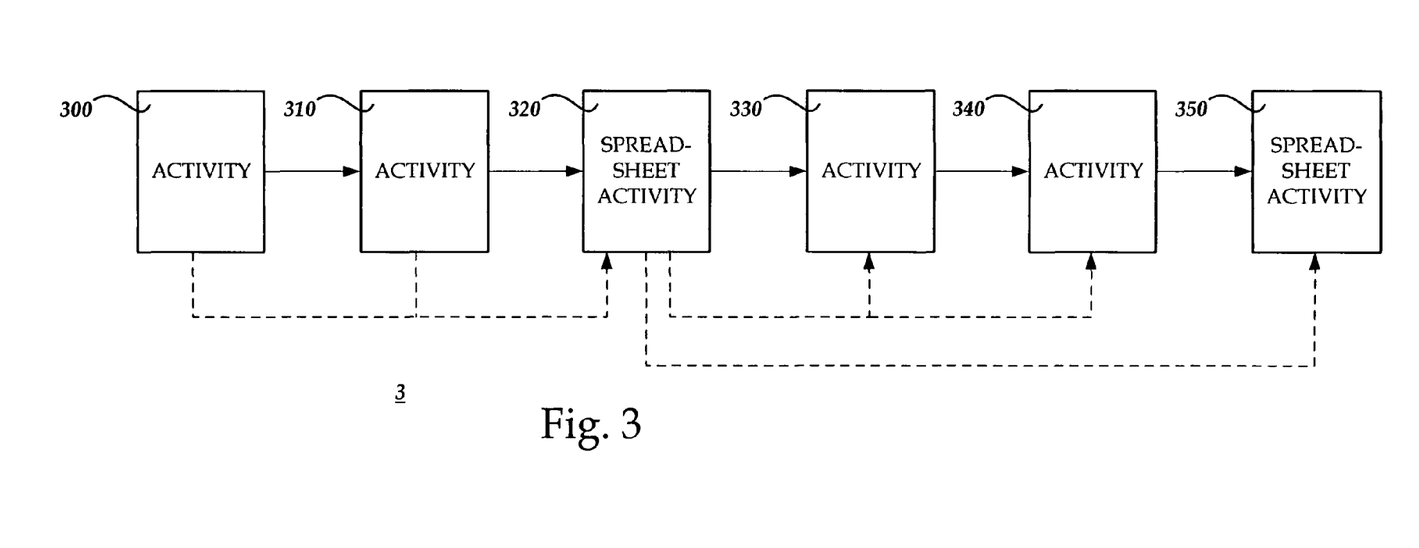
FIG. 3 is a diagram of an example workflow.

FIG. 3 is a diagram of an example workflow 3 that comprises activities 300, 310, 320, 330, 340, 350. A workflow may comprise user interface entry points, execution activity, and save activity, for example. Although six activities are shown, it is contemplated that any number of activities may be comprised within a workflow. An activity, e.g., activity 320, is provided that takes advantage of spreadsheet calculations, such as EXCEL calculations. The workflow progresses through activities 300 and 310, and then, for activity 320, calculation and extraction of values from a spreadsheet is performed. Thus, spreadsheet calculations are integrated into workflows without user intervention. For example, spreadsheet calculations are called as a step in an automated workflow. The spreadsheet file is recalculated during the workflow, at e.g., activity 320.

Values from previous activities in the workflow may be obtained and provided to the spreadsheet (e.g., cell values are set, modified, or adjusted). The spreadsheet may then be recalculated using these obtained values. As shown in FIG. 3, for example, values from activities 300 and/or 310 may be provided to activity 320, which uses these values in its spreadsheet calculation.

Moreover, values from the spreadsheet may be used in subsequent parts of the workflow. As shown in FIG. 3, for example, values determined at spreadsheet activity 320 may be provided to activities 330 and/or 340 for use in these activities. It is contemplated that any number of spreadsheet activities may be incorporated into a workflow, and that a first spreadsheet activity 320 may provide values to a second spreadsheet activity 350 or any other activity in the workflow.

Figure 4:
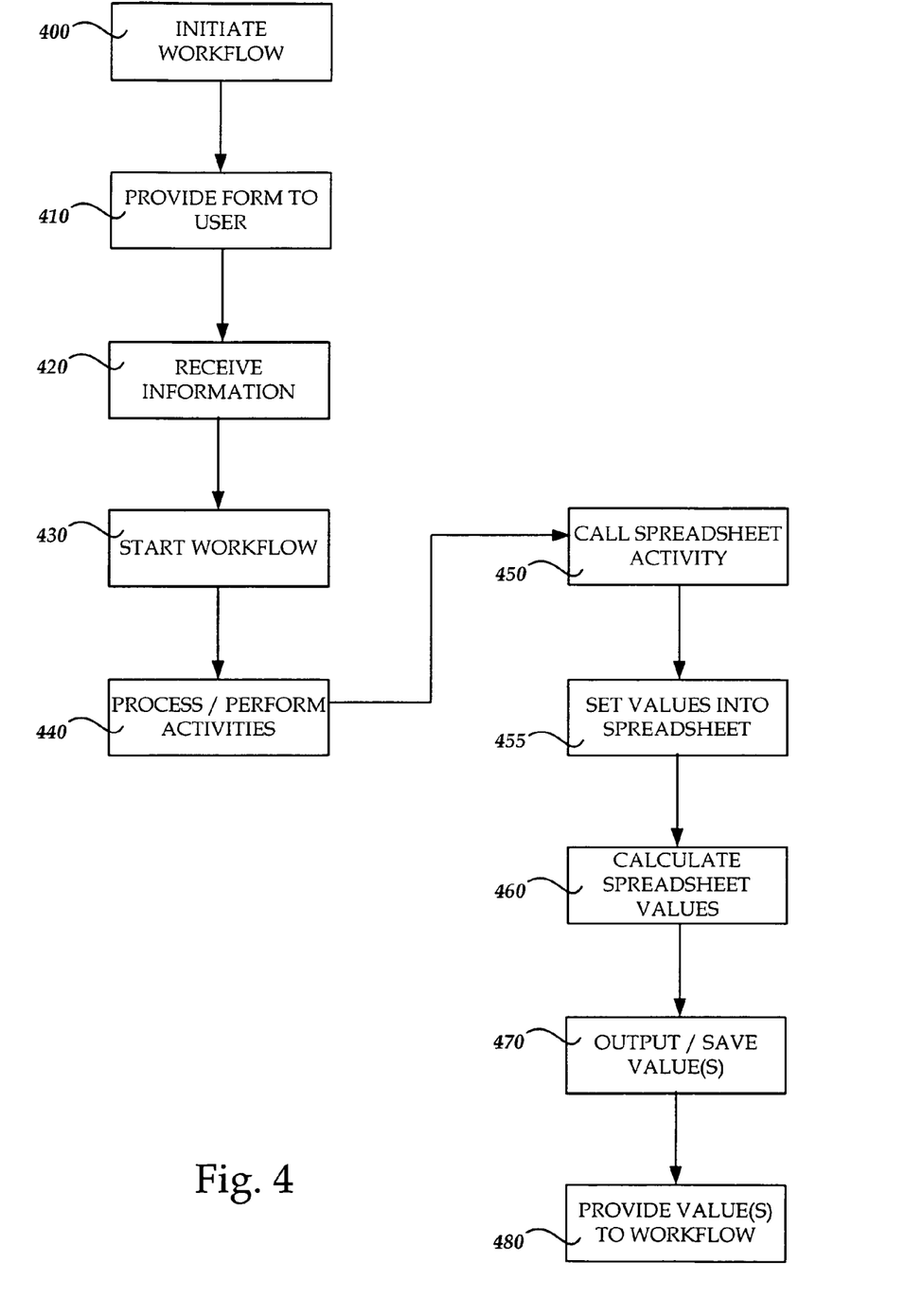
FIG. 4 is a flow diagram of an example process.

FIG. 4 is a flow diagram of an example process. The workflow enables scheduling a calculation, as well as automatic calculation of a spreadsheet. A user interface may be provided to receive input parameters. At step 400, a workflow is initiated, e.g., by a user, an application, or process. A form may be provided to the user at step 410 via a user interface for example. The form may be generated and provided locally, or at a server over a network for example, or partially locally and partially remotely. The user may enter information about the execution (e.g., parameters, values into a few cells, save path or options, output format, etc.) at step 420. This information may be stored locally and/or remotely (e.g., at a server, over a network, etc.). The workflow is then started at step 430.

At step 440, activities in the workflow are processed and performed, e.g., in a sequential order. At step 450, a spreadsheet activity in the workflow is called. At step 455, values received from the user at step 420 or from preceding activities in the workflow, for example, are set into the spreadsheet. The workflow automatically calculates the spreadsheet values at step 460. The workflow activity may be calculated using an input parameter setting, a single scalar output value, and an optional save-as, along with a snapshot capability, for example. It is contemplated that processing and calculations, for example, may be performed locally and/or remotely (e.g., at a server, over a network, etc.). In an embodiment, the spreadsheet activity is a workflow activity provided by EXCEL CALCULATION SERVER that loads, parameterizes, and executes an EXCEL workbook, returning the result of the workbook to the workflow for further manipulation.

More particularly, the workflow activity may be loaded, parameterized, and executed, using a spreadsheet program, such as EXCEL CALCULATION SERVER. Thus, a workflow loads the activity, enables setting of input parameters, and calculates the spreadsheet including refreshing external data. The execution activity performs actions in the spreadsheet, when called, such as opening the spreadsheet, setting parameters and values, and calculating (refreshing or recalculating) the spreadsheet. The activity can then expose an output value or can save the calculation at a predetermined location at step 470. Moreover, the results of the spreadsheet calculations may be provided to the workflow for further use and manipulation at step 480.

Figure 5:
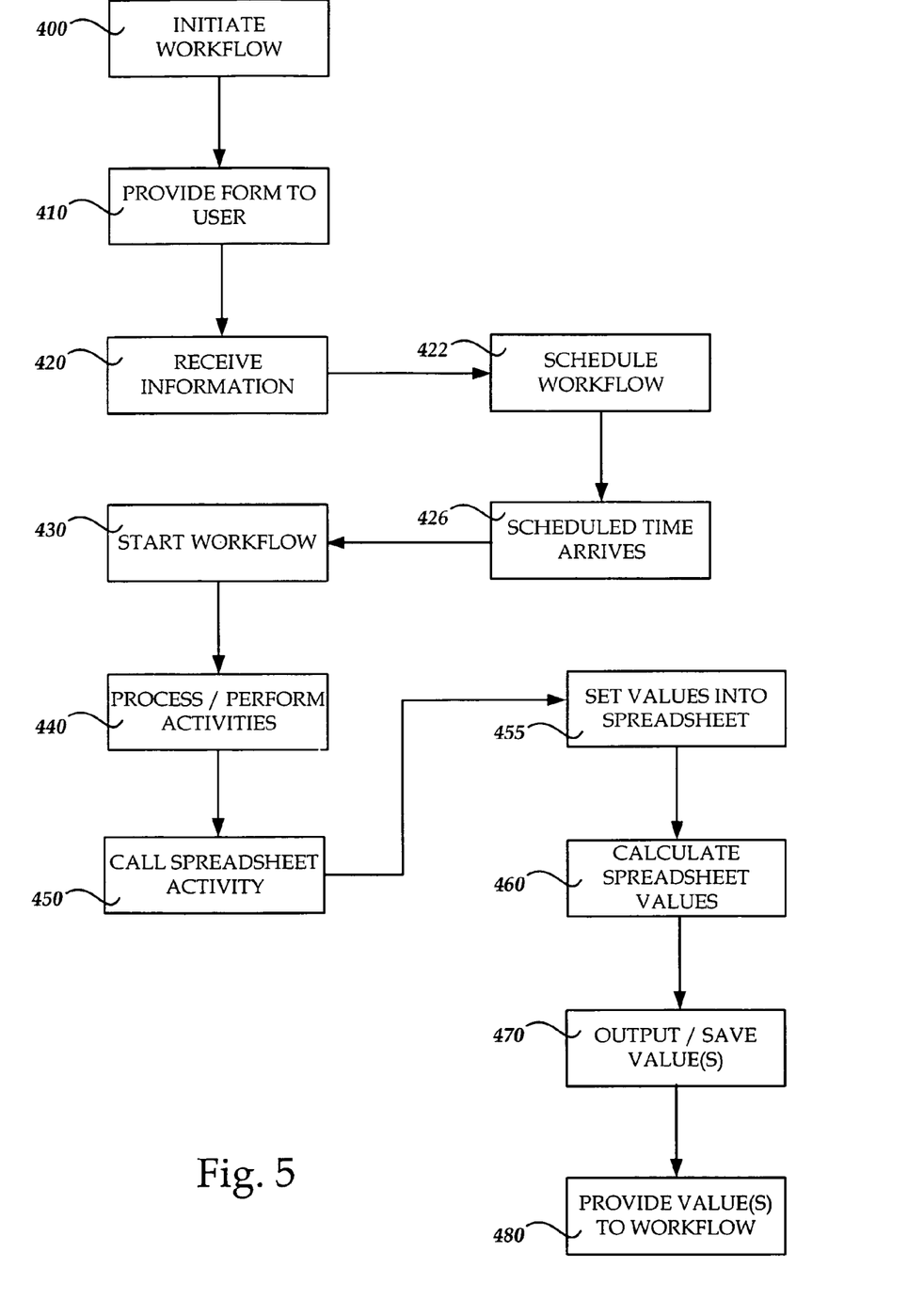
FIG. 5 is a flow diagram of another example process.

FIG. 5 is a flow diagram of another example process. FIG. 5 contains elements similar to those described above with respect to FIG. 4. These elements are labeled identically and their description is omitted for brevity. In FIG. 5, rather than starting a workflow (step 430) as soon as information is received (step 420), the workflow is scheduled at step 422, e.g., to begin at a certain time or upon occurrence of a particular event. The scheduled time or event may be provided by a user, an application, or process, for example. The frequency may be selected (e.g., once, hourly, daily, weekly, etc.) beginning at a certain date/time, for example, When the scheduled time or event arrives, at step 426, then the workflow is started at step 430. In this manner, a workflow may be postponed or delayed until, for example, additional data is received for subsequent use in the workflow.

In an example embodiment, a calculation is performed and the result is saved. Assume a user would like a complex model calculated with specific values, and that such a model would take a long time to calculate, tying up the client machine. The user can manually initiate the calculation workflow. A form is provided, where she parameterizes a few cells and sets the result file name, and starts the workflow.

In another example embodiment, a calculation may be scheduled, e.g., for subsequent offline view. For example, suppose a user wants to calculate a spreadsheet workbook every morning to reflect last night's inventory numbers. The spreadsheet workbook may be sent in email to the user. The user schedules a calculation workflow to start on this file every morning at 4 am. Every morning, an updated version of the spreadsheet workbook is sent in email to the user. This can either be a snapshot of the spreadsheet workbook or the complete spreadsheet workbook depending on the settings. A scheduled spreadsheet activity may be provided with input parameters, no output, optional save-as with snapshot capability, and notification.

A workflow can be built to open a spreadsheet, read an output value, and update a property in the file's document library, for example. Suppose a document library contains a team's expense reports and all the reports have the total expense in cell Sheet1:B2. The library has a "Total Expense" column. Whenever a new expense report file is dropped in the library, a workflow fires, reads cell Sheet1:B2, and updates the "Total Expense" property of the file, so that the value shows up in document library views.

There are multiple implementation techniques, e.g., an appropriate API, tool kit, driver code, operating system, control, standalone or downloadable software object, etc. which enables applications and services to use the systems and methods for providing and enabling the functionality. Various implementations described herein may have aspects that are wholly in hardware, partly in hardware and partly in software, as well as in software.

As mentioned above, while exemplary embodiments have been described in connection with various computing devices and network architectures, the underlying concepts may be applied to any computing device or system that uses workflows. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments.

As mentioned, the various techniques described herein may be implemented in connection with hardware or software or, where appropriate, with a combination of both. Thus, the methods and apparatus, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the aspects described herein are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality. Additionally, any storage techniques may invariably be a combination of hardware and software.

While preferred embodiments have been described, it is to be understood that other similar embodiments may be used or modifications and additions may be made to the described embodiment for performing the same function without deviating therefrom. It should be emphasized that a variety of computer platforms, including handheld device operating systems and other application specific operating systems are contemplated, especially as the number of wireless networked devices continues to proliferate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method of performing a spreadsheet calculation in an automated workflow, comprising:
    initiating the automated workflow comprising a plurality of activities, wherein the plurality of activities comprises a first activity, a second activity, a third activity and a fourth activity, and wherein the first and third activities are not spreadsheet activities and the second and fourth activities are spreadsheet activities;
    calling the first activity in the automated workflow, wherein the first activity modifies a value to result in a first value;
    calling the second activity in the automated workflow, the second activity being associated with a first spreadsheet, wherein the second activity modifies the first value to result in a second value, and wherein the modifying the first value to result in a second value comprises:
        retrieving the first spreadsheet associated with the second activity from a database storing the first spreadsheet;
        receiving the first value from the first activity for use by the second activity, wherein the first activity precedes the second activity; and
        calculating the first spreadsheet using the first value to result in the second value;
    providing the second value calculated at the second activity to the third activity in the automated workflow, wherein the third activity modifies the second value without user intervention to result in a third value; and
    providing the third value to the fourth activity in the automated workflow, wherein the fourth activity modifies the third value to result in a fourth value, and wherein the fourth activity recalculates the first spreadsheet using the third value to result in the fourth value.

2. The method of claim 1, further comprising providing a form to a user to receive data for use by the second activity.

3. The method of claim 1, further comprising providing the fourth value as an output of the automated workflow after the fourth activity recalculates the first spreadsheet using the third value to result in the fourth value.

4. A computer implemented method of performing a spreadsheet calculation in an automated workflow, comprising:
    scheduling the automated workflow to start pursuant to a scheduled event, wherein the automated workflow comprises a plurality of activities including a first activity, a second activity, a third activity, and a fourth activity, and wherein the first and third activities are not spreadsheet activities and the second and fourth activities are spreadsheet activities;
    starting the automated workflow pursuant to the scheduled event occurring;
    calling the first activity in the automated workflow, wherein the first activity modifies a value to result in a first value;
    calling the second activity in the automated workflow, the second activity being associated with a first spreadsheet, wherein the second activity modifies the first value to result in a second value, and wherein the modifying the first value to result in a second value comprises:
        retrieving the first spreadsheet associated with the second activity from a database storing the first spreadsheet;
        receiving the first value from the first activity for use by the second activity, wherein the first activity precedes the second activity; and
        calculating the first spreadsheet using the first value to result in the second value;
    providing the second value calculated at the second activity to the third activity in the automated workflow, wherein the third activity modifies the second value without user intervention to result in a third value; and
    providing the third value to the fourth activity in the automated workflow, wherein the fourth activity modifies the third value to result in a fourth value, and wherein the fourth activity recalculates the first spreadsheet using the third value to result in the fourth value.

5. The method of claim 4, wherein scheduling the workflow comprises receiving information about the scheduled event via data provided from a user.

6. The method of claim 4, wherein the scheduled event comprises a predetermined time.

7. The method of claim 4, further comprising providing a form to a user to receive data for use by the second activity.

8. The method of claim 4, further comprising providing the fourth value as an output of the automated workflow after the fourth activity recalculates the first spreadsheet using the third value to result in the fourth value.

9. A computer-readable storage medium encoding a computer program of instructions for executing a computer process, the computer process comprising:
   initiating an automated workflow comprising a plurality of activities, wherein the plurality of activities comprises a first activity, a second activity, a third activity, and a fourth activity, and wherein the first and third activities are not spreadsheet activities and the second and fourth activities are spreadsheet activities;
   calling the first activity in the automated workflow, wherein the first activity modifies a value to result in a first value;
   calling the second activity in the automated workflow, the second activity being associated with a first spreadsheet, wherein the second activity modifies the first value to result in a second value, and wherein the modifying the first value to result in a second value comprises:
      retrieving the first spreadsheet associated with the second activity from a database storing the first spreadsheet;
      receiving the first value from the first activity for use by the second activity,
   wherein the first activity precedes the second activity; and
      calculating the first spreadsheet using the first value to result in the second value;
   providing the second value calculated at the second activity to the third activity in the automated workflow, wherein the third activity modifies the second value without user intervention to result in a third value; and
   providing the third value to the fourth activity in the automated workflow, wherein the fourth activity modifies the third value to result in a fourth value, and wherein the fourth activity recalculates the first spreadsheet using the third value to result in the fourth value.

10. The computer-readable storage medium of claim 9, further comprising data representing a scheduled event to start the automated workflow.

11. The computer-readable storage medium of claim 9, further comprising providing a form to a user to receive data for use by the second activity.

12. The computer-readable storage medium of claim 9, further comprising providing the fourth value as an output of the automated workflow after the fourth activity recalculates the first spreadsheet using the third value to result in the fourth value.

* * * * *